July 3, 1962

A. WOLFENSPERGER 3,042,066

BALL TYPE LUBRICATED PLUG VALVE

Filed May 27, 1958

INVENTOR
Adolph Wolfensperger

BY
Strauch, Nolan + Neale
ATTORNEYS

INVENTOR
ADOLPH WOLFENSPERGER

BY *Strauch, Nolan & Neale*

ATTORNEYS

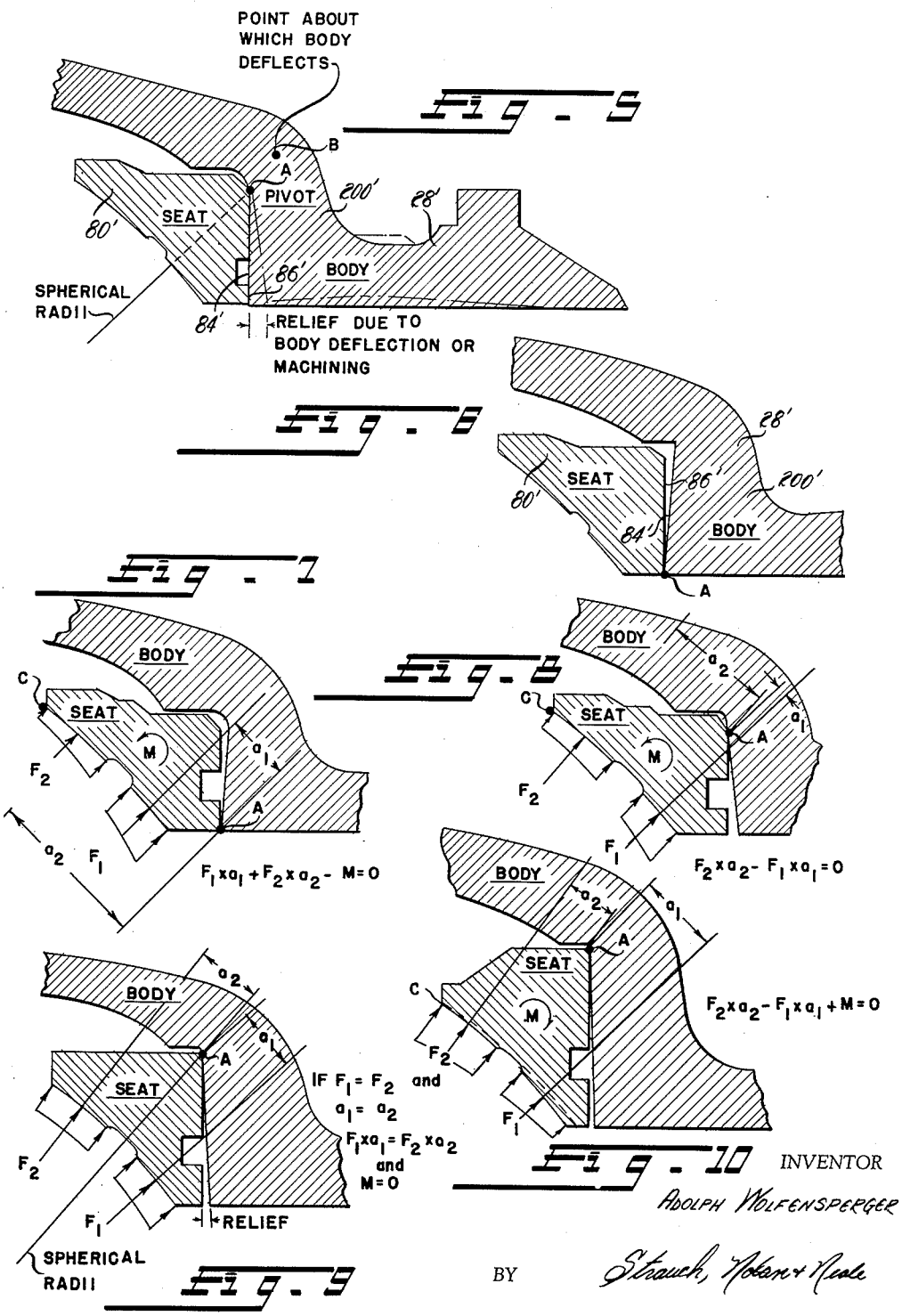

United States Patent Office 3,042,066
Patented July 3, 1962

3,042,066
BALL TYPE LUBRICATED PLUG VALVE
Adolph Wolfensperger, Pittsburgh, Pa., assignor to Rockwell Manufacturing Company, Pittsburgh, Pa., a corporation of Pennsylvania
Filed May 27, 1958, Ser. No. 738,114
13 Claims. (Cl. 137—246.11)

This invention relates to ball type valves for use in large high pressure fluid pipe lines up to 30 inches and more in diameter and is particularly directed to lubricated ball valves and improvements in plug seat rings and the plastic lubricant sealing and jacking arrangement. This application is a continuation-in-part of my copending application Serial No. 521,495, filed July 12, 1955 for Ball Type Valve.

As discussed in application Serial No. 521,495, an ideal seat ring for a large lubricated ball valve will be more or less free to "float" a slight amount, both radially and axially, so that it may adjust itself to the surface of the spherical valve plug. Other lubricated ball valves, e.g., as disclosed in Patent No. 2,788,015 to George F. Scherer, are constructed primarily for axial shift. The self adjustment enabled by the floating disposition of the seat rings was intended and supposedly allowed the seating pressure between the valve plug and the seat ring to be uniform throughout the extent of the plug to ring seating surface. It has been discovered as a result of extensive tests on valves built according to the structure disclosed in application Serial No. 521,495 that a high pressure zone existed near the bore of the seat ring, which caused the lubricant to be extruded and wiped away from that area. The area was marked by a bright, shiny, dry surface showing signs of extreme wear. Loss of lubricant, which is primarily a sealant is conducive to leakage and also results in high plug operating torques.

Accordingly a primary object of this invention is to provide a ball type valve for use in high fluid pressure services embodying novel structural cooperation between the plug, and cooperating seat ring and valve body construction to provide balanced force transmission from the lubricant through the seat ring to the valve body.

A still further object resides in providing a novel lubricated ball type valve having novel floating seat ring construction providing a uniform maximum jacking force with minimum lubricant groove area in the ball seating surfaces.

Another object resides in the provision in a lubricated ball type valve of a novel seat ring arrangement in which the seating engagement of the downstream ring seat against the valve body when the plug is closed and under line pressure occurs at a radially outer circular portion of the ring and a radius of the spherical seating surface passing through the location of engagement between ring seat and valve body intersects the annular lubricant groove in the spherical seating surface of the ring seat. In connection with this object, it is a further object to provide the spherical seating surface on the ring seat with an annular lubricant groove essentially midway of the width of the spherical seating surface.

Still another object resides in the provision of a seat ring in a lubricated ball type valve as in the foregoing object wherein the seating surface is provided with side by side annular lubricant distribution grooves connected at one or more intervals by a cross groove, the combined width of seating surfaces between such grooves being essentially evenly disposed on each side of the biasing lines of force from the radially outer portion of the back face of the seat ring to body seating engagement along radii of the spherical seating surface.

Further novel features and objects of this invention will become apparent from the following detailed description and the appended claims taken in conjunction with the accompanying drawings showing a preferred embodiment thereof, in which:

Figure 2:
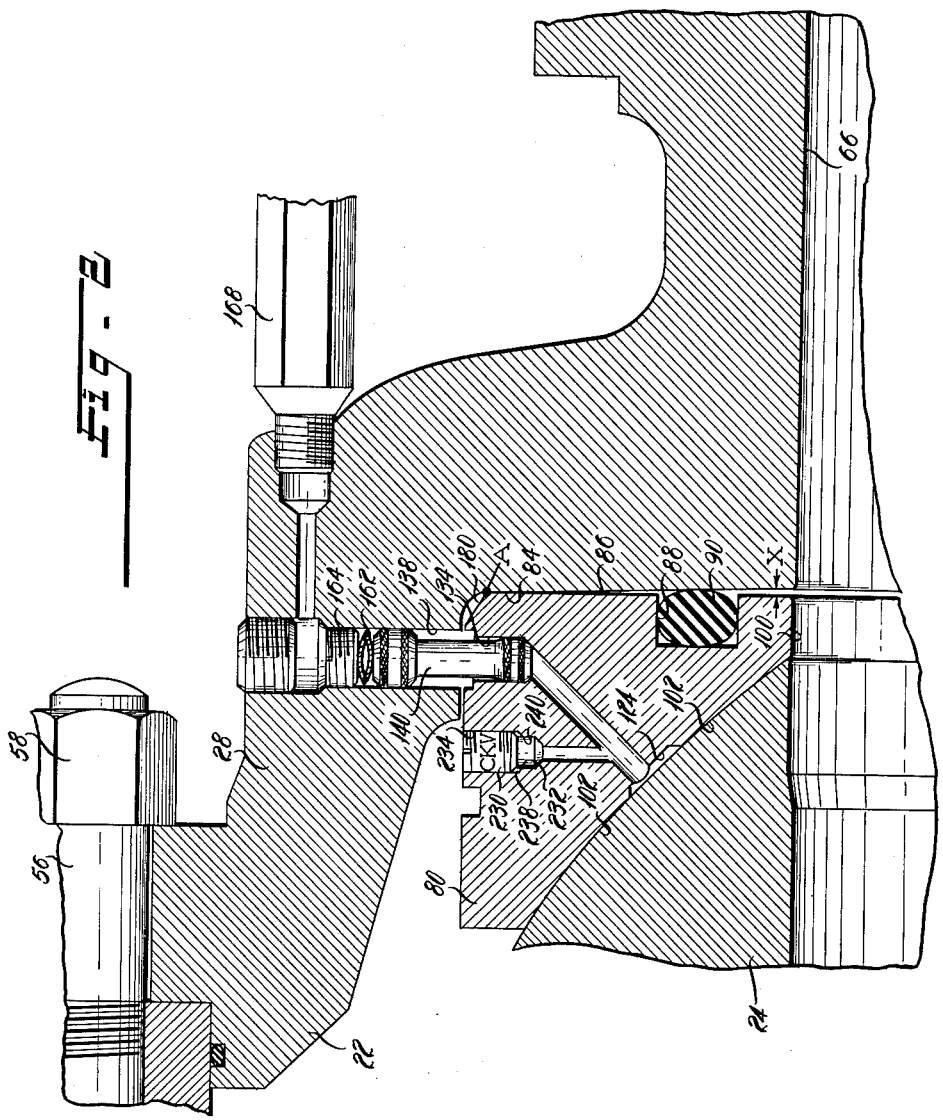
FIGURE 2 is an enlarged detail section view of the plug, floating ring seat and the valve body illustrating a lubrication fitting and the relief clearance between the back face of the ring seat and the valve body.
Figure 11:
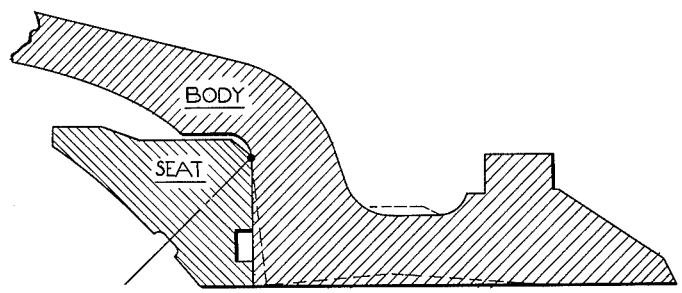
Figure 12:
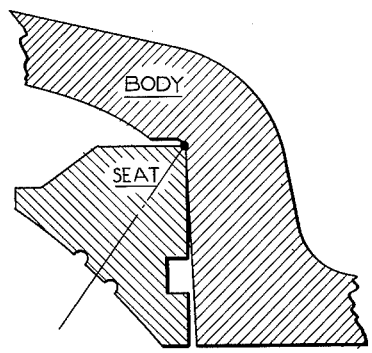

FIGURES 5, 6, 7, 8, 9 and 10 are diagrammatic views similar to FIGURE 2 illustrating various conditions of contact between a ring seat and the valve body, FIGURES 5-8 illustrating an unbalanced ring seat construction similar to that taught by application Serial No. 521,495, FIGURE 9 illustrating a balanced ring seat construction according to the present invention, and FIGURE 10 illustrating a theoretical ring seat unbalanced in a manner opposite to that of FIGURES 5-8;

FIGURE 11 illustrates a seat ring construction in which seating surfaces on each side of the groove are unequal but the lubricant groove is aligned with the spherical radii through the seat ring circular contact abutment on the back face; and FIGURE 12 illustrates the use of a plural number of parallel lubricant grooves in which the midpoint of the set of parallel grooves is located according to this invention.

The drawings illustrate a thirty inch sphere valve embodiment wherein the relative dimensions and various structural reinforcing ribs and members have been designed for use in a specific system. The large size of the spherical plug in this valve makes it possible to use various combinations of internal ribbing and also to vary the wall thicknesses depending upon the strength and rigidity required in the specific installation.

Wherever the terms "upper," "lower" and other indications of relative positions are used in the specification and claims, reference is being made to the valve as illustrated, with the power operator at the top, and with a vertical rotational axis for the valve element. It is to be understood that these terms are used merely for convenience of description since there are no structural restrictions to mounting the valve in any position, as required by the connecting conduits and location of the valve installation.

Figure 1:
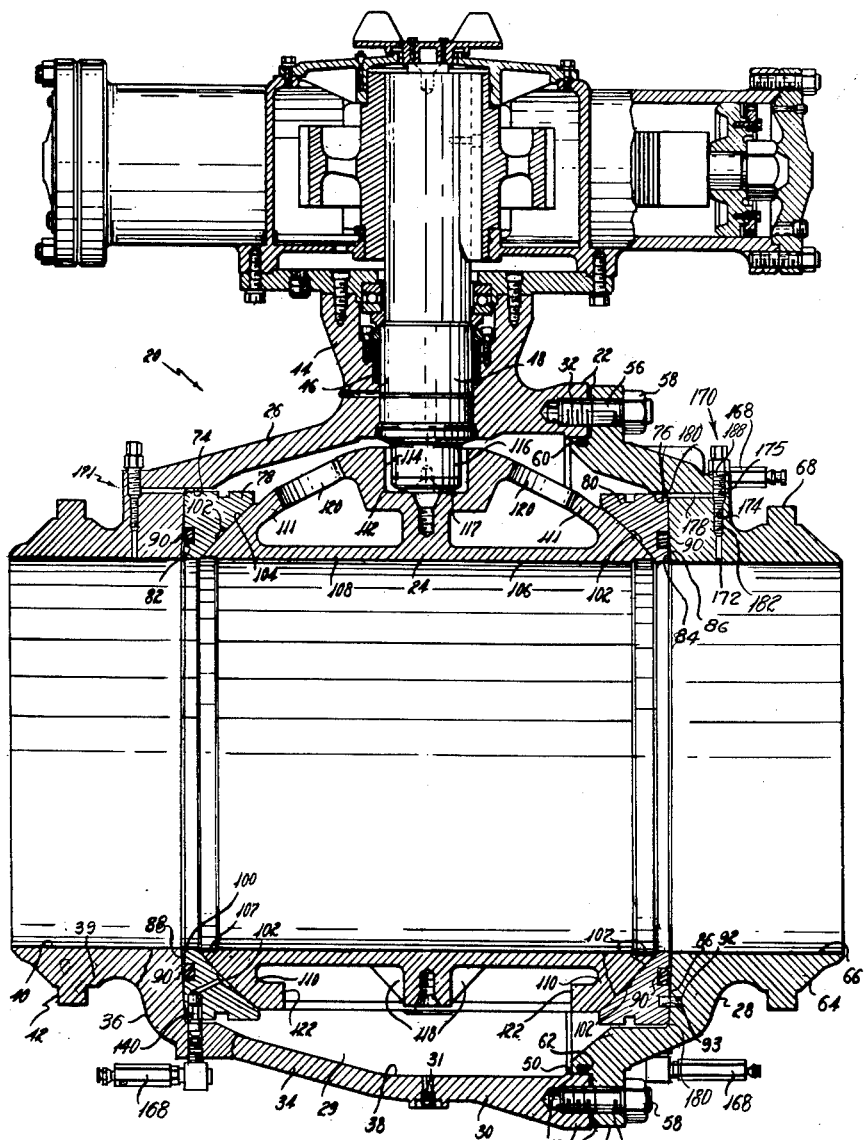
FIGURE 1 is a side elevation partially broken away and in section, illustrating a lubricated spherical zone seating or ball type valve with its floating ring seats according to a preferred embodiment of this invention.

In the drawings, reference number 20 identifies the valve assembly of this invention which includes a two-part valve body or casing 22 enclosing the hollow core rotatable ball plug 24 and having spaced zoned plug spherical seating surfaces. As illustrated in FIGURE 1, casing 22 consists of two portions rigidly fastened together, a major substantially cylindrical portion 26, and a slightly dished end portion designated as tail piece 28. The two portions 26 and 28 provide the complete valve body 22 with an internal cavity 29 containing the plug 24 and the seat rings to be described.

Major body portion 26 has a peripheral axially directed generally cylindrical wall 30 with the right-hand end formed as a mounting flange 32 for the tail piece 28. A drainage plug 31 is provided in the bottom wall. The opposite end portion 34 of peripheral wall 30 has a convergent taper ending in an integral end wall 36. The peripheral surface 38 of the major body part 26 constitutes the major portion of body cavity 29 and is partially cylindrical and partially convergent like the wall 30, 34 with a major diameter slightly greater than that of the spherical plug element 24 to permit insertion of the plug 24 into the cavity. Sufficient clearance is provided between plug 24 and the body wall surface to enable controlled full floating displacement of the plug element and unimpeded passage of fluid around the plug within the body cavity 29. A cylindrical flow passage 40 is provided through end wall 36 of body part 26 and within extension 39 which has a pipe line mounting flange 42, both the extension and flange being integral with end wall 36. The upper portion of cylindrical wall 30 includes an integral apertured boss 44 with the aperture 46 being provided with various grooves and shoulders, permitting installation of a valve plug operating stem 48. Stem 48 is inserted through aperture 46 from within the body cavity, prior to assembly of the plug unit 24 and tail piece 28. Specific details of the operating stem and motor operator are not part of this invention, however they are more fully described in application Serial No. 521,495.

The inner periphery 50 of the mounting flange 32 is machined to provide a cylindrical pilot bore for a complementary cylindrical locating shoulder 52 provided on the joining flange 54 of tail piece 28 which is spigoted in mating relation with body portion 26 whereby the shoulder 52 rests within pilot bore 50. The two mounting flanges 32 and 54 are fastened together as by studs and nuts 56 and 58. Suitable shims 59 may be used between the flanges 32 and 54 to provide proper assembly clearance and a sealing O-ring of rubber or the like 60 is disposed with a resilient deformation in an annular groove 62 provided around the locating shoulder 52. Tail piece 28 includes an integral end extension 64 similar to that on body portion 26, formed with a cylindrical flow passage 66 which in assembly is coaxial with flow passage 40. Extension 64 has a conduit mounting flange 68 similar to mounting flange 42. Flanges 42 and 68 at the open ends of both flow passages 40 and 66 enable connection by conventional means to pipe line conduits. By accurately co-aligning the tail piece flow passage 66 with the cylindrical locating shoulder 52 and similarly co-aligning the flow passage 40 in body part 26 with pilot bore 50, accurate co-axial assembled alignment of the two flow passages 40 and 66 will be assured.

Valve body 22 may be made in a manner other than that disclosed. For example, the major part of the valve body may be entirely cylindrical and include the entire valve cavity in which case the tail piece would constitute a substantially flat plate fastened to the closure mounting flange of the major portion; or the valve body could be formed as two substantially semi-spherical portions split along the stem aperture.

An annular shoulder recess 74 is provided within the body portion 26 at the junction of the convergent wall 34 and end wall 36, and, in assembly, is substantially coaxial with and the same size as a similar annular shoulder recess 76 in the inner surface of tail piece 28 adjacent its fluid passage 66. The cylindrical shoulders of recesses 74 and 76 have a diametral dimension which is greater than that of the valve seat rings 78 and 80 which are axially slidably mounted therein. The exact radial clearance between the seats and the valve body in the exemplary disclosure is not critical within close tolerances, and hence the cylindrical peripheries of recesses 74 and 76 may be finally formed during casting of body parts 26 and 28. The end faces 82 and 84 of recesses 74 and 76 are provided with smooth essentially plane surfaces perpendicular (excepting as hereinafter described) to the axis of flow passages 40 and 66 and backing the valve seat rings 78 and 80. The radial dimension of recesses 74 and 76 must be within a rough tolerance so as to provide a minimum misalignment of the seat rings with the body flow passages.

*Seat Rings and Ball Plug*

Seat rings 78 and 80 are preferably made of high tensile iron, for cost considerations, but may be made of other suitable metals or non-metals. Each ring has a substantially plane smooth end face 86 containing an annular groove 88 for receiving a sealing O-ring 90 of synthetic rubber or other suitable resilient material to effect a deformable fluid tight seal with surfaces 82 and 84 of recesses 74 and 76. O-rings 90 are of a sufficient diameter relative to the depth of grooves 88 to result in their deformation between the seat rings 78 and 80 and the valve body recesses in the assembly by an amount greater than the total relative axial displacement between the seat rings and the plug and the body. This assures that the resilient biasing force of the upstream O-ring 90 will tend to maintain that ring and the plug in substantial surface abutment when the downstream O-ring 90 is deformed the maximum extent and the plug and downstream seat ring shifted axially due to line pressure. For ordinary temperature ranges, O-rings 90 are preferably fabricated from oil resistant synthetic rubber but where higher temperatures are encountered, rings of "Teflon," "Silastic," or the like plastics may be used. Each seat ring 78 and 80 is maintained non-rotatable about its axis relative to the valve body by a single axial dowel pin 92 slidably projecting into a socket 93 in the seat ring and an aligned hole in the valve body. This pin 92 primarily pro-locates the seat ring so its lubricating groove ends will be properly circumferentially situated for functional cooperation with the dwarf lubrication grooves in the plug, as will be fully described hereinafter. The use of but a single dowel pin 92 in each ring, loosely fitted in a socket 93 on the end plane face 86 of the respective seat rings, enables both axial displacement and displacement in the radial sense about the eccentric axis of pins 92 of the seat rings in their recesses.

The bores 100 of seat rings 78 and 80 are cylindrical and substantially the same size as flow passages 40 and 66 and, as previously described, will be maintained substantially coaxial with those flow passages, slight coaxial deviation being permitted by the radial float arrangements of the seat rings relative to the valve body. Rings 78 and 80 are provided with annular spherically concave seating surfaces 102 for cooperation with the spherically convex seating surface zones of the spherical plug 24, which latter is provided with a cylindrical through port 106 at least as large as the flow passages 40 and 66. The ring bores 100 (FIGURE 7) may be of slightly larger diameter than flow passage 66 and plug port 106 to permit a slight radial displacement of the rings without projecting an edge of the bore 100 into the line of flow of fluid through the port 66. Similarly the ends 107 of the plug through port 106 are of slightly larger diameter than the ring bores 100 to permit slight misalignment between the plug port and ring bores without projecting the plug port lips into the line of flow of fluid. The edges of the flow passages 40 and 66, the ring bores 100 and the plug port 106 are chamfered to further enable smooth flow of fluid in valve open condition.

The diametrical ratio of the port orifice to the spherical plug diameter may be varied depending upon the line pressures and valve sizes. Ratios of as high as 3.0:1.0 or more, or as low as 1.5:1.0 or less, may be desirable depending upon the valve size, line pressures and operating torque desirable. The disclosed embodiment utilizes a ratio of 1.61:1.

Figure 4:
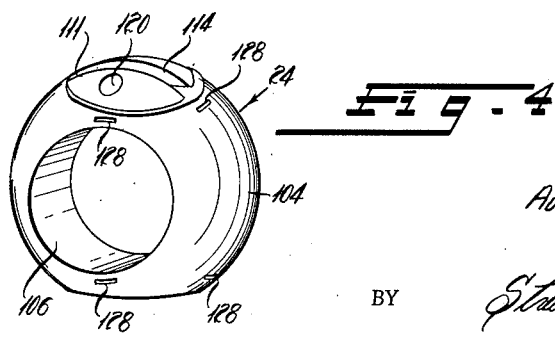
FIGURE 4 is a small perspective view of the spherical plug.

*The ball plug.*—Referring to FIGURES 1 and 4 is a hallow cored plug 24 with a through port 106. To reduce the weight of the plug, that portion of the plug opposite its connection to an actuating stem and not including any necessary seating or journalling structure, may be substantially removed to provide a flat circular portion at the base of the plug 24. The plug of this invention is made by using preformed cores during casting to provide a rigid body structure having relatively thin flow passage defining walls 108 and slightly heavier spherically surfaced walls 110 to provide the ball seating surfaces. The upper portion of the plug 24 has an outer generally spherical wall section 110, slightly smaller in diameter than the diameter of the spherical seating surface 102, integrally joined with a heavy portion 112 extending approximately transverse to the axis of through port 106. Formed in the exterior upper wall section 110 in the heavy transverse portion 112 is a cross groove 114 for receiving the tang 116 of the operating stem 48. A clearance is provided between tang 116 and the groove walls 114 to enable proper radial and axial floating movement of plug 24 and permit alignment and displacement with seat rings 78 and 80. Appropriate intternal rib reinforcing structures 118 are integrally cast between the spherical wall portions of the plug 24 and the cylindrical wall 108, and are provided with through passages serving as weight elimination holes and enabling fluid under pressure on the external side of spherical plug 24 to reach all surfaces within the core structure. Holes 120 in the top wall 110 of plug 24 are formed by core prints during casting but adequately serve to reduce overall plug weight. At the diametral top and bottom of through port 106 two bosses appear which include countersunk pilot openings. These bosses, used in the final machining of the spherical seating surfaces on the plug element, have no specific function in the assembled valve.

The edges of the open bottom of spherical wall 110 may be reinforced by thick rim portions 122 to provide additional rigidity to the portion of the spherical seating surface coacting with ring seats 78 and 80. The plug element spherical surface coacting with the accurately machined annular spherical zone surfaces 102 on ring seats 78 and 80 is also accurately machined for close and accurate fit with the ring seat seating surfaces. Although the actuating stem tang 116 fits with a clearance in groove 114 the plug will still be substantially maintained with through port 106 coaxially aligned with flow passages 40 and 66 when the valve is in open position since the control coaction between tang 116 and groove 114 is such that only a very minor amount of rotative play is permitted to plug member 24.

Figure 3:
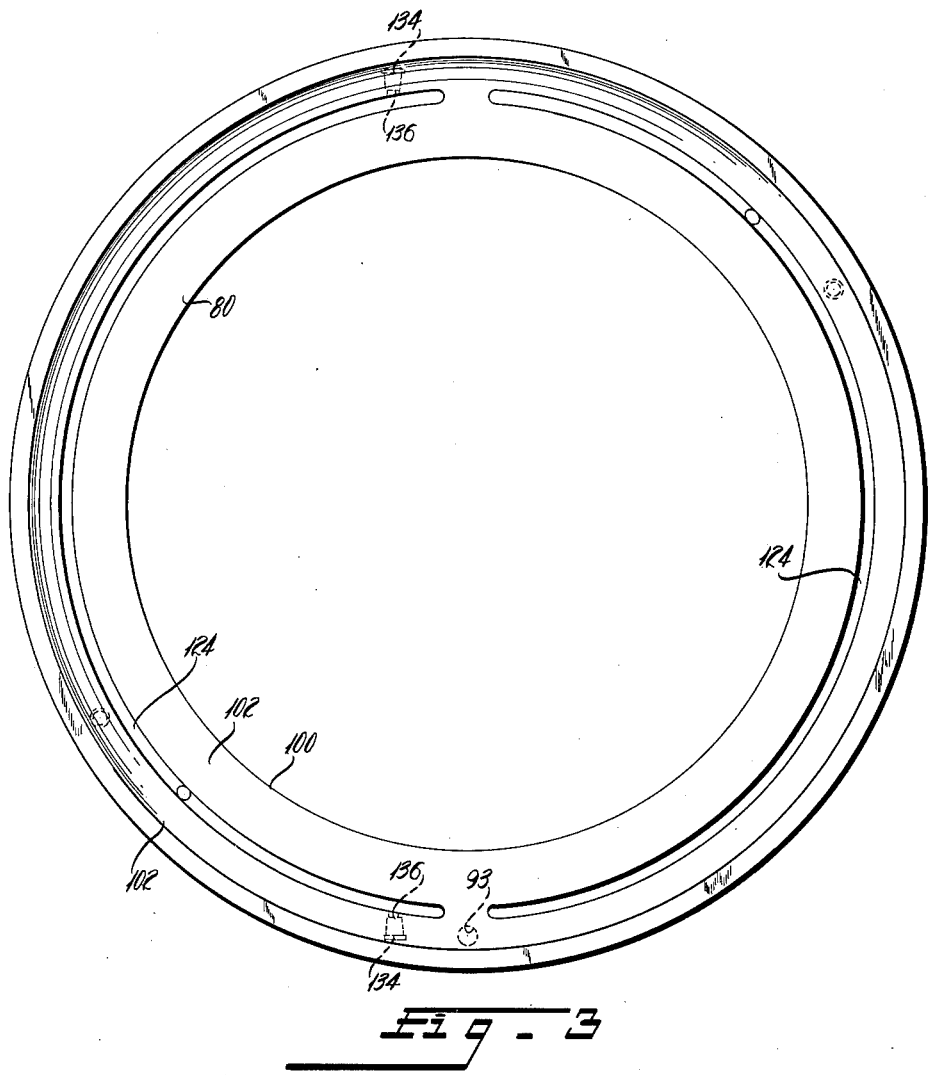
FIGURE 3 is a vertical elevation of one of the floating ring seats looking at the spherically formed seat.

As shown in FIGURES 2 and 3, each valve seat ring 78 and 80 has its spherical seating surface 102 provided with and annular lubricant groove 124. Groove 124 of each ring is discontinuous for a short extent at the top and bottom separated by portions of the spherical seating surface 102. As illustrated, the groove 124 may be of substantially uniform depth although it can be of semi-circular cross-section if desired. Plural side by side parallel interconnected grooves, similar to that disclosed in application Serial No. 521,495 can be used in lieu of the single groove.

With reference to FIGURES 1, 2 and 4, plug 24 is provided with a set of dwarf grooves 128 at 90° intervals around the top and bottom margins of the spherical seating surface. These dwarf grooves are long enough to bridge the discontinuities or lands of the lubricant groove 124 in the ring seat spherical surface in either the valve fully opened or fully closed positions, which positions are 90° apart and determined by suitable coacting stops (not shown) on the stem and valve body. When the lubricant groove 124 is bridged at its discontinuities by dwarf grooves 128, the lubricant grooves and the plastic lubricant contained therein become effectively continuous about the ball on the opposed seating surfaces contacted by the seat rings.

According to accepted theory, the amount of hydraulic force required for jacking the plugs and seats axially apart was a function of the area of the lubricant groove multiplied by the unit fluid pressure exerted on the plastic lubricant within the groove. The plug and seat ring arrangement is not limited to the use of only one groove as the invention contemplates the use of any desired number to provide the effective jacking force required. The groove 124 is adapted to receive a fluent plastic material which, in addition to transferring the jacking force between the plug and seats, also seals and lubricates the plug seating surface.

Lubricant Fittings

With reference to FIGURE 1 and enlarged detail FIGURE 2 each seat ring 78 or 80 is provided with at least one and preferably two substantially radial bores 134 each intersecting a lubricant groove 124. When the seat rings 78 and 80 are assembled in the body recesses 82 and 84 and angularly located by dowel pins 92, their substantially radial bores 134 will be aligned with bores 138 in the adjacent portions of body portions 26 and 28. As illustrated in FIGURE 2 the diameter of ring bore 134 is less than that of body bore 138 to provide ease of alignment between the bores 134 in seat rings 78 and 80, which have axial play relative to the body as previously mentioned, and the fixed location of the body bores 138 and facilitate insertion of a lubricant conducting bushing 140. The differential diameters also serve to permit a universal rocking movement of the special non-flexible lubricant bushing 140, the construction of which is fully described in application Serial No. 521,495.

With bushing 140 properly placed in position to cooperate between the seat rings and valve body in bored passages 134 and 138, three or more compressed Belleville type disc spring washers 162 are positioned on top of each bushing and insure the bushing being fully inserted and retained in its ring bore yet permitting universal rocking of the bushing. A check valve 164 is threaded into a tapped outer end of the body passage 138 and abuts and retains spring discs 162 against the bushing 140. An extrusion screw lubricator 168 is threaded into a cross passage intersecting body passage 138 above the check valve 164. This lubricator may be the type disclosed in copending U.S. application Serial No. 371,884 filed August 3, 1953 by C. R. Rieff, now Patent No. 2,776,026 granted Jan. 1, 1957. After the lubricator 168 is filled with lubricant, subsequent applications of pressure lubrication may be obtained by turning the lubricant screw head portion (not shown) with a suitable wrench. The check valve ball is not backed by a spring because in installations using high viscosity lubricant it is often the practice to eliminate such check valve springs. However, if it is desired, a spring backed ball check valve may be used. The difference in the radii of passageway 134 in valve seat ring 80 and the valve body passage 138 be at least equal to the total axial play which is possible between the seat rings 78 and 80 and the valve seat recesses 82 and 84, otherwise structural interference may occur between the bushing wall and the side wall of bore 138.

By-Pass Valve Assemblies

FIGURE 1 discloses considerable space between the inner peripheral surface of the body casing 22 and the outer surface of the plug 24. This enables passage of line fluid throughout the complete body cavity and completely around the plug between the seat rings. The aforementioned hollow core plug element 24 with the core print holes 120 and weight reducing holes in the reinforcing ribs 118 permit such fluid to pass around the plug 24 and into its interior completely surrounding the cvlindrical wall 108 around the through port 106. Means for introducing line fluid under pressure from whichever flow passage is upstream are provided in each of the body portions 26 and 28. Only one of these means is usually operative to permit fluid flow at a time depending upon the direction of fluid flow in the service installation. To this end by-pass check valve assemblies 170 and 171 are provided respectively in the radial portion of tail piece 28 and the end wall 36 of the body portion 26 (FIGURE 1). The details of these by-pass valves are fully described in the application Serial No. 521,495. Sufficient for this description, shown in FIGURE 1, a radial passage 172 passes from tail piece flow passage 66 to the exterior of the tail piece and has two successive tapped counterbores 174 and 175. At the transition between tapped counterbores 174 and 175 an axial passage 178 intersects the passage 172 and passes to the interior of the valve body cavity at tail piece recess 84. The chamfered outer edge 180 of seat ring 80 provides fluid communication between passageway 178 and the annular side wall clearance between the ring 80 and the circumferential wall 76 of the recess 84. Thus line fluid is permitted to pass from the tail piece flow passage 66 through passageways 172 and 178 into the body cavity 29.

Threaded into and tightly seated at the bottom of counterbore 174, a special check valve 182 is arranged to permit fluid flow only in the direction from flow passage 66 into the body cavity.

Threaded into the upper tapped counterbore 175 above check valve 182 is a high pressure needle valve assembly 188. When the needle valve assembly is threaded into the tapped counterbore 175 it will control line flow through the check valve 182 through passage 178 into the valve body cavity. Valve assembly 171 is identical to assembly 170.

The purpose of the by-pass check valves 170 and 171 at both fluid passage ends of the valve body is to introduce upstream line pressure into the body cavity surrounding the plug element independently of flow direction. This equalizes the pressure around the upstream seat ring and prevents it from being forced with high differential pressures against the spherical seating surface, thus reducing frictional drag on the plug when it is operated. Without this by-pass, if the upstream seat ring tightly seats against the ball with the cavity around the ball at lower than line pressure, the high upstream pressure acting against the O-ring 90 between the valve body and the upstream seat ring will cause that seat ring to bear too heavily against the spherical seating surface of the plug element. By balancing the pressures and reducing the upstream seat ring seating action a substantial reduction of operating torque is realized.

The purpose of needle valves 188 is to selectively cut off the application of line pressure to the back of the upstream seat ring and assure means for obtaining a gas tight seal in the event the downstream check valve fails to seat. Both needle valves are normally opened, but the downstream needle valve can be closed if leakage occurs through its related check valve when the plug valve 20 is in closed position.

Experimentally it has been determined that line fluid pressure enters the valve body cavity whether or not the valve is open. The needle valve assembly 188 however acts as a safety device against accidental closing of clearances which would prevent such line fluid pressurizing of cavity 29.

Line Fluid Pressure on Lubricant

In FIGURE 2 a check valve 230 is shown in a passageway 232 extending from the outer peripheral surface of ring seat 80 to the groove 124 on the spherical seating face of the seat ring. Each of the seat rings 78 and 80 includes one or more of such check valves 230 which are threaded into the tapped counterbored outer end 234 of a passageway 232. The inner end of the check valve 230 is shouldered to receive and tightly clamp a seal ring 238 against the top edge of a reduced counterbore 240 at the base of counterbore 234.

The purpose of the check valve 230 is to insure that the lubricant pressure in the valve 20 is always at least equal to line pressure. The lubricant grooves in the seat rings are made up of two semi-circular grooves 124 in each ring which are joined by mating dwarf grooves 128 on the ball plug 24 when the valve is fully opened or fully closed. While the valve plug 24 is being positioned between open and closed positions, one of the semi-circular grooves 124 in each ring may be exposed to downstream pressure which may be as low as atmosphere. After the plug 24 is fully opened or closed, the groove 124 which had been exposed to the downstream, and so has little or no lubricant pressure, is re-connected with the lubricant system. The pressure of the lubricant system will drop as it equalizes in pressure with the low pressure groove 124. If the valve is operated enough times without re-lubrication, the lubrication system pressure may drop to a very low value. In order to allow the lubricant system to remain at least at line fluid pressure, the check valve 230 from the body cavity to the lubricant groove 124 in the valve seat ring allows line fluid pressure to be exerted on the lubricant system but does not allow lubricant to escape into the valve body when the lubricant pressure exceeds the line pressure.

Considering the plug 24 in valve closed position, with line pressure forcing the plug against the downstream seat ring, the seating force applied by the line pressure will be equal to the pressure differential times the area over which the pressure differential acts, which may approach a minimum of approximately 670 square inches if the plug seats only at the extreme inner edge of the seating surface. Without the check valve the pressure may act over an area approaching a maximum of approximately 1120 square inches if the plug seats at the extreme outer edge of the seating surface or if it seats over the entire area. With the check valve open, upstream pressure is permitted to enter the lubricant grooves and, when the entire spherical seating area is seated, the pressure on the lubricant in the grooves will at least balance the pressure over the area of the grooves and can even balance the pressure over the entire area between the grooves to the outer edge of the seating surface if sufficient lubricant film exists.

With respect to FIGURE 1 it will be seen that each seat ring 78 and 80 is provided with two radial passages 134 (see FIGURE 2) for introducing lubricant to the distribution groove 124 and similarly each seat ring co-operates with two lubricant bushings 140 and their associated check valves 164 and lubricators 168. Although one lubrication assembly for each seat ring 80 can be sufficient, two or more are preferred located at opposite ends of the seat groove lengths to assure a speedy and sure distribution of the plastic lubricant throughout the entire extent of the lubricating grooves. Whether one or two lubricant assemblies are used, the lubricant is introduced to the ring groove 124 on the sides which always contact the plug spherical surface, when the plug is being turned between fully open and fully closed positions. Thus a lubricant flow path from the lubricant assemblies will never be open directly into the plug port 106.

Special Seat Ring Construction

A comparison of FIGURE 2 or 9 which shows a ring seat in accord with this invention, with FIGURE 7, representative of the seat ring construction of Serial No. 521,495, will reveal that the new seat ring 80 has a more symmetrical cross-section. Compared with the previous ring (FIGURE 7) the radial dimension of the new ring 80 is greater and its axial dimension is less so that the area of the spherical seating surface 102 has remained essentially unchanged.

To understand the exact reason for, and to fully comprehend, the invention involved, it will be necessary to review some of the interacting conditions that occur between the valve body, the plug and the floating seat rings of a lubricated ball valve. FIGURES 5 through 10 show some of these conditions. The diagrammatic figures are all of a downstream seat ring and must be considered as showing the seat ring in a valve which has been placed so that the line fluid flow passage is horizontal, and the fluid flow is from the left of the page to the right.

Referring now to FIGURES 5 and 6, the three possible conditions of contact between the valve body and the seat ring are illustrated. As has already been disclosed in application Serial No. 521,495, there is radial clearance between the seat ring 80′ and the valve body 28′. The exact radial clearance between a seat ring and the valve body recess is not critical within close tolerances and hence the recess periphery need not be machined with high accuracy. In practice a diametral clearance of about 0.015 inch is provided. Thus the circumferential surfaces of the recesses generally locate and retain the seat ring substantially coaxially around the valve body passages and the critical contact between valve body and seat ring will be only between the essentially radially extending surfaces respectively of the valve body and the seat ring. To visualize the cross-sectional FIGURES 5 and 6 properly, the radially extending surface 86' of the ring must be considered as being a perfectly formed plane surface lying completely within a plane extending radially at 90° to the axis of the seat ring bore. If that is the case, then the radially extending surface 84', of the valve body seat ring recess must be in one of three conditions when there is no pressure on the valve. If the valve body recess surface 84' is at a perfect 90° to the axis of the bore, it will coincide with and contact the radially extending surface 86' of the ring 80' at all points along their mutually radially extending surfaces. This condition is illustrated by a solid line in FIGURE 5. If the radially extending wall surface 84' of the valve body recess is not at 90° to the axis of the ring bore 100, it will be slightly conical, inclining away from the radially extending surface of the seat ring 80' from a circle of contact located at either the inner or outer periphery of the radial surface 86' of the ring 80'. FIGURE 6 illustrates the case of the conical surface 84' inclined away from the seat ring 80' from a circle of contact at the inner periphery of the seat ring, and the dotted lines in FIGURE 5 illustrate the case of the conical surface 84' inclined away from the seat ring 80' from a circle of contact at the outer periphery of the radial surface 86' of the ring.

The condition originally sought was to have the radial surfaces of both the seat ring and valve body in the same plane at 90° to the axis of the seat ring bore. However, due to machining inaccuracies or deflection of the valve body under pressure, any of the aforenoted three conditions could result. The final effect, then, was not a surface-to-surface contact through the extent of the radial planar surfaces but rather a circle or narrow circular band of contact between the seat ring and the valve body which is represented in the cross-sections in FIGURES 5–10 by the point designated A. The reason that the true planar surface condition of the valve body wall and the conical surface condition inclined toward the seat ring at the greatest diameter are both shown in the same drawing (FIGURE 5), is that it has been determined that the true planar condition of surfaces 84' and 86' becomes transformed into the latter condition when the valve plug is closed and the valve is subjected to rated line pressure. Further discussion will clarify this point.

The valve body wall portion 200' adjacent the seat ring recess changes direction at the point B marked on FIGURE 5 as the point about which the body wall portion 200 deflects. If an axial force is applied to the downstream seat ring 80', as happens when the plug is in the closed position under pressure, the point B where the body wall portion 200' changes direction will serve as a fixed base, and the radial wall portion of the body will deflect under the load similar to the manner in which a loaded beam, fixed at one end, deflects. If the radial surfaces 84' and 86' of the valve body 28' and the seat ring 80' are in co-planar engagement throughout their extent before the pressure load is applied, the deflection will grow progressively greater as the pressure is applied and the surfaces 84' and 86' will begin to separate, at their respective areas of smallest diameter, under the load. The area of contact between the two surfaces 84' and 86' will continue to diminish until the force will be transmitted to the body wall through the circular line or small area of contact indicated by the point marked "A." This circle of contact will be near the outer periphery of the radial surface 86' of the seat ring 80', since the corresponding area on the valve body surface 84' is closest to the point B about which the valve body wall portion 200' deflects and so is subject to the least deflection.

Referring now to FIGURE 6, it may be seen that if the condition existing there exists while the valve is not under pressure, when the valve is put under pressure with the plug closed, the area of contact in FIGURE 6 will increase with pressure and will approach the condition of mating planar surfaces due to the body deflection. It has been determined that the conditions represented by FIGURE 5 are preferable to the condition represented by FIGURE 6. The reasons for this will be explained by utilizing the diagrammatic showing of FIGURES 7, 8, 9 and 10.

FIGURES 7 and 8 show seat rings with the general configuration of the rings disclosed in Serial No. 521,495. FIGURE 9 is the new ring as presently utilized, and FIGURE 10 is a ring built to the opposite configuration of the ring of FIGURES 7 and 8. With reference to FIGURES 7 and 8, it has been determined that due to manufacturing inaccuracies, either one of the two extreme conditions depicted by FIGURES 5 and 6 was usually present in the lubricated ball valves built in accordance with Serial No. 521,495. It has also been determined that either of these conditions results in a non-uniform thickness of lubricant film which causes wearing and binding conditions at the ring seat to ball seating surfaces adjacent the bore of the seat rings.

In FIGURE 7, the incline of the slightly conical surface of the radial surface of the valve body is such that the circle of contact between the body and the seat ring is near the inner periphery of radical surface of the ring. Now, when an axial pressure is exerted against the closed ball plug, the force transmitted to the valve body wall will tend to deflect the wall and widen the area of contact between the ring and body. The extent to which this occurs will depend upon the tensile strength of the materials and the amount of incline of the original conical surface. In any event, this widening condition of contact will not materially affect an analysis drawn from FIGURE 7. When the ball is forced against the ring under pressure, the ring will in turn bear against the body wall at the circle represented by point A. Since the ring will tend to be supported by the body wall along the circle of contact, the remaining portion of the ring will tend to deflect under the force of the ball on the ring. This deflection will be opposed by an internal moment of the ring caused by its rigidity. The internal resisting moment is indicated on the drawings by the arrow M.

The deflection of the ring takes place about the circle of contact of the ring with the body wall surface represented by point A. Thus, the resistance to the deflection due to the internal moment will become less as the distance from point A increases. If the valve is under pressure and there is little or no lubricant between the ball and the seat ring, since the resistance to deflection of the ring decreases radially outwardly from the axis of the bore, the force per unit area on the sperical surface of the ring will be greatest at the bore of the ring and will diminish as the distance from the bore increases. Now, if lubricant is introduced under pressure to the lubricant groove, it will tend to separate the surfaces of the ball and the ring. Since the force per unit area on the ring surface will be least near point C (FIGURE 7), the lubricant will take the path of least resistance and extrude from between the ring and the ball at that point without ever forcing its way between the ring and the ball at the bore of the ring nearest point A. This condition would account for the wear at the bore of the ring.

In FIGURE 8, the condition present still causes wear at the bore of the seat ring, although the condition is not as extreme as that of FIGURE 7 and the wear would probably not be as great. In FIGURE 8 the surface conditions of the radial surfaces of the seat ring and valve body correspond to the surface conditions described in connection with FIGURE 5. The circle of contact has been shifted to a point near the outer periphery of the ring, as indicated at A. The seat ring will still deflect about A and the greatest force per unit area will still be opposite point A on the spherical surface of the ring. This opposite area is located by a radius of the spherical surface which passes through location A. Such radius is hereinafter referred to as a spherical radius. Since the ring will deflect more readily at distances removed from A, the force per unit area on the ring surface will be least at point C (FIGURE 8), as in the condition of FIGURE 7. The force per unit area on the ring surface will be less at the bore of the ring than it was in FIGURE 7, but it will still be greater than at point C of FIGURE 8. When lubricant is introduced at the lubricant groove, it will still have a tendency to extrude toward point C although the tendency will not be as pronounced as the condition of FIGURE 7.

To correct the wear and inefficiency of previous ring seats that caused higher operating torques to be required by the valve, a seat ring, the principles of which are exemplified in FIGURE 9, is proposed. This new ring enables a uniform lubricant film to be distributed over the entire seating surface of the ring. Referring to FIGURES 1 and 2, the two primary changes that enable this desired condition are:

(1) The machining of the valve body ring seat recesses 74 and 76 are controlled to insure that the radial surfaces 82 and 84 are always in a condition which would conform to that shown in FIGURE 5 and would never allow a condition such as shown in FIGURE 6. In other words, the radial surface 84 or 86 of the body recess 74 or 76 is formed so that when the valve is under pressure, a divergence or clearance between the radial surfaces of the body and ring results and this clearance increases in a direction inwardly toward the axis of the ring bore.

(2) The radial dimension of the seat ring is predetermined of a sufficient magnitude that the ultimate circle of contact A (FIGURE 9) between the body and the seat ring is located far enough outward that a radius of the spherical seating surface of the ring passing through a point on the circle of contact between the ring and body would come very close to the center of the lubricant groove in the spherical seating surface. Tests indicate that the lubricant groove should be located at that position on the seating surface of the ring which has the greatest resistance to deflection. Preferably the midpoint of the seating surface should be at the same location as the lubricant groove, but present knowledge indicates that groove location is the more critical of the two factors.

Preferably, to be mechanically accurate the lubricant groove should be displaced, from the spherical radius through the circle of contact very slightly so that the groove is closer to the bore of the seat ring. Since in actual manufacture, the fact that the radius of a spherical plug with a 30 inch bore is a few thousandths of an inch smaller than the radius of the spherical seating surfaces of the ring causes the area of the seat ring that has the highest resistance to seat ring deflection to be shifted slightly toward the bore of the ring from the line normal to the seating surface that passes through the circle of contact.

As may be noted from FIGURE 9, the tendency to deflect in either direction about point A causes equal forces per unit area along the surface of the ring at equal distances, on either side, away from point A. If lubricant is introduced at the lubricant groove, the force on the seat ring resulting from lubricant in the groove is in direct alignment with the contact point A and no moment results from such force tending to deflect the ring in either direction. Lubrication will be distributed essentially uniformly over the entire seating surface of the seat ring, which is the desired condition.

FIGURE 10 has been included to show the danger of having a condition reverse to that of FIGURE 8. In FIGURE 10, the circle of contact A between the body and ring is able to move to a point where a line normal to the spherical surface and passing through the circle of contact would be farther removed from the bore than in any of the conditions previously considered. Under this condition, the seating force on the ring per unit area would be greater at point C than at the bore of the ring. Thus, the lubricant would be extruded at the ring bore and wear would occur at point C. Since C is at a greater radial distance from the axis of the flow passage than the bore is, any wearing and non-lubrication of the ring in that vicinity would be even more undesirable than wearing at the bore. The circumference of the circle of wear at C would be greater than that at the bore and so the total wear and non-lubrication would be greater. This condition would require even higher valve operator torque than does a condition such as occurs in FIGURE 8.

FIGURE 11 illustrates a method of utilizing the previous ring configurations by shifting the lubricant groove to the point of least deflection. Although this results in unequal ring seating surfaces on each side of the groove, test results indicate that the resultant lubricant pressure over the entire seating surface is almost as good as when the seating surface is also bisected by the line of least deflection.

FIGURE 12 illustrates the use of a plural number of parallel lubricant grooves in which the midpoint of the set of parallel grooves is located on the line of least deflection.

Referring again to FIGURE 2, the utilization of the principles of the invention will be apparent in the ring 80 and body recess of the present ball valve 20 where a slight relief X is shown at the bore of the seat ring between the axially facing wall 84 and 86 of the body 28 and the ring 80. This leaves the circle of ultimate contact (point A) between the ring and the body at a position which is substantially equidistant from the two ends of the spherical seating surface 102 of the ring 80.

It will be noted that the inventive concept, i.e., the proper shape of the ring cross-section combined with a relief between the ring and the valve body at the bore of the ring, may be achieved in several ways. Early in this description, for the purpose of developing the theory behind the invention, it was assumed that the radial surface of the seat ring was in a single, perfect plane. It may be seen that the same results are achieved if that surface of the ring were made slightly conical to provide a relief between the ring and the body at the bore of the ring. Thus, the relief necessary for the inventive concept may be provided by machining the ring or machining the valve body. Alternatively if the two surfaces are precisely radially coplanar, the desired relief will result from natural body deflections, although this latter structural relationship would be quite costly to produce intentionally.

The total intentional relief at the bore of the ring between the ring and the valve body will be on the order of .001″ to .003″. Application Serial No. 521,495 and this specification contain a statement to the effect that the mating radial faces of the seat ring and valve body prevent the O ring 90 from extruding as would happen if it were on an axially extending surface of the ring. The very small relief desired by this invention between these surfaces does not affect the validity of this statement since the large O ring 90 could not extrude into a .001″ to .003″ clearance.

In summary, the major essence of this invention may be considered to be the provision of adjacent substantially radial surfaces on the body and valve seat which are machined so as to provide a substantially line contact between the seat and body at a point near the outer periphery of the radial surface of the ring and body increasing inwardly to a maximum at the inner periphery of the radial surface of the ring, the ring being of such a cross-section that a line passing through the line of contact and normal to the spherical seating surface of the ring will pass substantially through the center of the seating surface.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a ball type lubricated plug valve assembly, a body having opposed aligned fluid passages, annular recesses within said body surrounding said passages, seat rings in said body recesses mounted for displacement at least axially of said passages on said body, mating surfaces of said rings and recesses being essentially parallel with a slight relief provided between the radially inward portions of said surfaces, a ported ball having spherical seating surfaces and rotatable between a position where its port aligns with and a position where it closes said passages supported wholly on spherical seating surfaces on said seat rings, circumferentially extending groove means in said spherical seat surfaces in essentially true alignment with the radially outer edge of said mating surfaces along lines of radius of said spherical surfaces, and means for introducing fluent sealant and lubricating plastic into said groove means for establishing a uniform layer of sealant and lubricant plastic between said spherical surfaces on said ball and said seat rings.

2. In a ball plug valve as defined in claim 1, said groove means in each ring comprising a single circumferential groove discontinuous at the top and bottom of the ring.

3. In a ball plug valve as defined in claim 1, said groove means in each ring comprising a plurality of coaxial parallel circumferential grooves discontinuous at the top and bottom of the ring.

4. In a ball plug valve as defined in claim 1, said groove means in each ring being disposed essentially midway between the inner and outer peripheries of the spherical seating surface on said ring.

5. A lubricated plug valve comprising: a hollow body having inlet and outlet ports; a plug element with an annular spherical seating surface rotatable in said body and having a through port connecting to the body ports when the valve is open; an annular seat mounted in said body surrounding the body outlet port and having a spherical sector surface in contact with one side of said plug spherical surface; a second annular seat mounted in said body surrounding the body inlet port and having a spherical sector surface in contact with the other side of the plug spherical surface; each of said seats being disposed for limited displacement radially and axially of said ports; fluid tight seals between the end faces of said seats and said body; lubricant groove means extending substantially entirely around each of said spherical sector seating surfaces in said annular seats; means for hydraulically separating said contacting spherical surfaces for spreading a uniform film of lubricant thereover and for freeing said spherical plug element for rotation comprising means for introducing lubricant under pressure from the exterior of said body into said groove means; means comprising portions of the back of each annular seat and the adjacent body wall adapted to essentially concentrate normal operational thrust loads between each of the annular seats and the body wall at a region adjacent the outer periphery of the back of each said annular seat to transfer the thrust loads through each annular seat to said body when the pressure on the downstream ring seating surface is increased sufficiently to result in deformation of the body wall; said groove means and said portions of said back of the associated said annular seat at a region adjacent the outer periphery of the back of the annular seat being in substantial alignment along radii of the annular seat spherical seating surface.

6. In a plug valve, a casing having inlet and outlet ports, a ported plug having spherical surface zones and rotatable between conditions wherein it interconnects or blocks fluid flow between said ports, seat rings within the casing surrounding said ports and having spherical seating surfaces engaging said plug surfaces for supporting said ball plug, groove means in said surfaces, means for introducing a fluent plastic material under pressure into said groove means, means mounting each said seat ring on the body so that said engaged seat ring and plug surfaces are substantially uniformly separated over their entire adjacent areas upon effective increase in lubricant pressure in said groove means, said groove means in said seat ring being slightly offset, toward the bore of the ring from extended spherical radii through the seat ring spherical surface and including a circular line of contact between the seat ring and the body, to accommodate the difference between the spherical radius of the ported plug and that of the ring seats so that the extended spherical radii of the ported plug which pass through the circular line of contact between the seat ring and body will essentially intersect said groove means.

7. In a plug valve, a body having inlet and outlet passages, a ported spherical plug in said body, seat rings having front and rear faces and mounted in said body at opposite sides of said plug, said plug being mounted on and between spherical sealing areas of the front faces of said rings for turning movement between valve open and valve closed positions, opposed substantially radially extending surfaces respectively on the downstream seat ring and in said body, one of said substantially radially extending surfaces being relieved with respect to the other to insure an annular area contact between the said radially extending surfaces and an increasing separation of said surfaces from said annular area contact to the inner periphery of said seat ring when the plug is in valve open position, said annular contact being located at a position radially outwardly offset from the inner periphery of said seat ring a distance sufficient to assure that said annular contact is in alignment with spherical radii of said plug passing through the ring front face sealing area whereby limited flexure of said seat is permitted about said annular contact when the valve is closed and under line pressure.

8. In a plug valve, a body having inlet and outlet passages, a ported plug in said body having spherical seating surfaces, spherically sealing surfaced seat rings within said body at opposite sides of said plug upon the spherical surfaces of which said plug is seated for turning movement between valve open and valve closed positions, each said seat ring having a bore therethrough substantially coaligned with an associated one of said passages, opposed transversely extending surfaces respectively on the downstream seat ring and in said body, said transversely extending surfaces being in engagement about an annular zone spaced radially outward from the bore of said downstream seat ring a distance sufficient to dispose said annular zone in spherical radii alignment with the spherical sealing surface of said downstream seat ring and one of said transversely extending surfaces, when there is no drop in pressure across the plug, being separated from the other over a substantial annular area extending radially outwardly from the inner periphery of said ring to said annular zone.

9. A plug valve as defined in claim 8, wherein groove means are provided in said spherical surfaces and means are provided for introducing a fluent plastic material under pressure into said groove means.

10. In a ball type lubricated plug valve assembly for a high fluid pressure line, a body having a cavity and opposed aligned fluid passages at opposite sides of said cavity, annular recesses within said body surrounding said passages, seat rings movably mounted in said body recesses substantially coaxial with said passages, mating surfaces of said rings and recesses being substantially parallel with a slight relief provided between the radially inward portions of said surfaces, a rotatable ported ball plug supported wholly upon seat rings at opposite sides within said body cavity, rotatable between a position where its ports aligns with and a position where it closes said passages, said ball and seat rings having coacting spherical seating surfaces, circumferentially disposed groove means in said spherical surfaces in substantial alignment, along lines of radius of said spherical seating surfaces, with a circular contact zone disposed radially outward of the inner periphery of the seat ring which will at least initially occur between at least the downstream said seat ring and its associated said body recess due to said slight relief when said downstream seat ring is forced into engagement with the body by line fluid pressure against said ball when in closed position, means for introducing and establishing a uniform layer of plastic sealant and lubricant in said groove means and between said surfaces, means for introducing line fluid pressure into said cavity surrounding said ball plug, and means enabling line fluid pressure from said cavity to enter said groove means in said rings and act on the plastic sealant and lubricant in said groove means and preventing reverse flow of plastic sealant and lubricant into said cavity when under pressure higher than line fluid pressure.

11. In a plug valve, a body having inlet and outlet passages, a ported plug in said body having spherical seating surfaces, spherically sealing surfaced seat rings within said body at opposite sides of said plug upon the spherical surfaces of which said plug is seated for turning movement between valve open and valve closed positions, opposed transversely extending surfaces respectively on the downstream seat ring and in said body, said transversely extending surfaces being in engagement about an annular zone and one of said transversely extending surfaces, when there is no drop in pressure across the plug, being separated from the other over a substantial annular area extending radially outwardly from the inner periphery of said ring to said annular zone, groove means circumferentially disposed in said spherical seating surfaces so as to be intersected by lines projected from said annular zone of engagement to the center point of said ring spherical sealing surfaces, and means provided for introducing a fluent plastic material under pressure into said groove means, said cooperative arrangement between said transversely extending surfaces providing a construction enabling a slight flexure of said ring so that the pressures between the plug and the downstream seat ring are substantially uniformly distributed over the spherical ring surface and lubricant under pressure introduced into said groove means will provide a substantially uniform separation between the entire adjacent areas of said downstream seat ring and plug spherical surfaces.

12. A valve, comprising a valve housing having inlet and outlet ports; a rotatable ball disposed in the space within said housing and having a fluid passage arranged in one rotational position of said ball to provide communication between said ports, said ball, in another rotational position thereof, being arranged to prevent communication between said ports; said housing having an annular valve seat adjacent and concentric with one of said ports, said seat comprising an annular substantially radially extending surface and an annular substantially axially extending surface; and an annular ball seat ring disposed in said seat and arranged to contact and support said ball, said seat ring being formed from a material having substantial flexural stiffness and hardness and having an inner diameter substantially corresponding to the diameter of said passage, an outer diameter substantially corresponding to the diameter of said substantially axially extending surface, an annular front face sealing area contacting said ball to provide a support for and seal with said ball, and a rear face extending substantially radially and outwardly from said inner diameter, said rear face having a circular zone radially spaced from the inner and outer diameters of said seat ring and arranged to contact said substantially radially extending surface as a fulcrum which is intersected by ball spherical radii passing through said ring front face sealing area, and an annular bearing area at least adjacent said inner seat ring diameter and axially spaced from said substantially radially extending surface under light load conditions but contacting said substantially radially extending surface under substantial load conditions due to torsional twisting of said seat ring about said fulcrum.

13. A valve assembly as defined in claim 10 wherein said plug is cored and said means for introducing line fluid pressure into the cavity comprises means provided at both ends of said valve body enabling a one way fluid passage from either inlet or outlet to the cavity of said body surrounding said plug for equalizing pressures on substantially all sides of the walls of said cored spherical plug element and said means enabling introduction of fluid line pressure on the sealant and lubricant includes passage means provided through said annular seats including means enabling introduction of fluid line pressure from said body cavity to the lubricant in said plurality of seating grooves.

References Cited in the file of this patent
UNITED STATES PATENTS

| | | |
|---|---|---|
| 1,604,488 | Seck | Oct. 26, 1926 |
| 2,000,494 | Nordstrom | May 7, 1935 |
| 2,516,947 | Blevans | Aug. 1, 1950 |
| 2,663,538 | Bacchi | Dec. 22, 1953 |
| 2,665,675 | Sheppard | Jan. 12, 1954 |
| 2,665,875 | MacGregor | Jan. 12, 1954 |
| 2,788,015 | Scherer | Apr. 9, 1957 |
| 2,788,016 | Scherer | Apr. 9, 1957 |
| 2,788,017 | Scherer | Apr. 9, 1957 |
| 2,796,230 | Grove | June 18, 1957 |

UNITED STATES PATENT OFFICE

CERTIFICATE OF CORRECTION

Patent No. 3,042,066  
July 3, 1962

Adolph Wolfensperger

It is hereby certified that error appears in the above numbered patent requiring correction and that the said Letters Patent should read as corrected below.

Column 4, line 25, for "pro-locates" read -- pre-locates --; line 65, for "hallow" read -- hollow --; column 5, line 41, for "and" read -- an --.

Signed and sealed this 13th day of November 1962.

SEAL)  
Attest:

ERNEST W. SWIDER  
Attesting Officer

DAVID L. LADD  
Commissioner of Patents